United States Patent
Yoshizawa

(10) Patent No.: US 7,828,387 B2
(45) Date of Patent: Nov. 9, 2010

(54) SEAT BACK STRUCTURE OF UPSIDE-RECESSED-AND-HEADREST-STORAGE TYPE OF SEAT

(75) Inventor: Hisayuki Yoshizawa, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 11/966,655

(22) Filed: Dec. 28, 2007

(65) Prior Publication Data

US 2009/0167064 A1 Jul. 2, 2009

(51) Int. Cl.
*A47C 1/10* (2006.01)
(52) U.S. Cl. ............ 297/391; 219/396; 219/410
(58) Field of Classification Search .......... 297/391, 297/396, 410
See application file for complete search history.

(56) References Cited

U.S. PATENT DOCUMENTS

| | | | | |
|---|---|---|---|---|
| 2,466,553 A | * | 4/1949 | McDonald | 297/404 |
| 2,652,101 A | * | 9/1953 | Samsky et al. | 297/114 |
| 3,159,427 A | * | 12/1964 | Lawson | 297/410 |
| 3,462,193 A | * | 8/1969 | Yasuo | 297/410 |
| 3,738,706 A | * | 6/1973 | Caldemeyer | 297/410 |
| 4,854,639 A | * | 8/1989 | Burleigh et al. | 297/250.1 |
| 5,106,158 A | * | 4/1992 | Dukatz et al. | 297/396 |
| 5,282,667 A | * | 2/1994 | Elton et al. | 297/238 |
| 6,183,045 B1 | * | 2/2001 | Marfilius et al. | 297/391 |

FOREIGN PATENT DOCUMENTS

| | | | |
|---|---|---|---|
| JP | 05056827 A | * | 3/1993 |
| JP | 05115332 A | * | 5/1993 |
| JP | 2002-125793 A | | 5/2002 |

* cited by examiner

*Primary Examiner*—Laurie K Cranmer
(74) *Attorney, Agent, or Firm*—Browdy and Neimark, PPLC

(57) ABSTRACT

A headrest storage recession of seat back in an upside-recessed-and-headrest-storage type of seat has, provided at the backward side thereof, an integral combination of a cover element and an upward extension of a back board disposed behind the seat back. Namely, the cover element is connected continuously with the back board upward extension, without any connection line therebetween. A thin hinge portion is defined in boundary between those cover element and upward extension, and the cover element is folded relative to such thin hinge portion and securely attached to the upward extension, thereby constituting a backward wall of the headrest storage recession.

5 Claims, 3 Drawing Sheets

SEAT BACK STRUCTURE OF UPSIDE-RECESSED-AND-HEADREST-STORAGE TYPE OF SEAT

BACKGROUND OF THE INVENTION

1. Field of the Invention

The present invention relates to an upside-recessed-and-headrest-storage type of seat which is formed with a headrest storage recession in a top portion of the seat back thereof, thereby enabling a user to retract and store an entire body of headrest in that headrest storage recession, lest the headrest should project from the seat back, so as to provide a unitary appearance of seat back, as if the headrest was an integral part of the seat back. More specifically, the invention is directed to a structure of the seat back in this particular kind of seat.

2. Description of Prior Art

There has been known a seat of the type wherein the seat back thereof has a headrest storage recession defined in the top portion thereof, or what can be described as an upside-recessed-and-headrest-storage type of seat (this term will be used hereinafter), which allows an entirety of headrest to be stored in the headrest storage recession, as if the headrest itself was embedded in the top of seat back thereof and became an integral part of the seat back, while on the other hand allowing the headrest to be raised from that storage recession to a desired level for supporting a head of user.

Such upside-recessed-and-headrest-storage type of seat has been applied to vehicle or automotive seats, and in particular applied to a fold-down vehicle seat, a retractable vehicle seat, and the like, which is collapsible into a small-sized configuration. For, a whole of the headrest can easily be lowered to and stored in the headrest storage recession of the seat back, thus completely preventing projection of the headrest from the top of the seat back to thereby avoid interference with any other surrounding items and things.

Recently, in view of increasing demands for small-sized and thin mode of the fold-down vehicle seat or retractable vehicle seat, each of headrest and seat back thereof inevitably requires further reduction in thickness. Those demands and requirements are also extended to the aforementioned upside-recessed-and-headrest-storage type of seat with a headrest storage recession in the top portion of seat back thereof. In particular, this kind of seat actually require reducing a depth of the headrest storage recession at the seat back top thereof in view of the foregoing demands.

In order to meet such recent demands, by way of example, the Japanese Laid-Open Patent Publication No. 2002-124793 discloses a seat back structure of this kind of seat having a headrest storage recession in the seat back top thereof, wherein a rigid and thin back board is securely attached to an entirety of backward surface of seat back so as to cover a backward side of a headrest storage recession defined in the seat back top, while on the other hand, a thin cover plate member is securely attached to a forward side of that headrest storage recession and juxtaposed on the corresponding upper local area of the afore-said back board. In that way, the thickness of the recessed headrest storage region is reduced.

However, the foregoing prior art has been found defective in that the back board and cover plate member are provided independently of each other, which requires an increased number of component parts and much more labor to assemble those two elements together, and also raises the problem of troublesome maintenance and control of the relevant component parts. Further, putting together such separate back board and cover plate member inevitably leaves a connection line there between on a finished seat back, which is exposed outwardly and viewed as an objectionable spot that impairs an aesthetic appearance of the seat back.

SUMMARY OF THE INVENTION

In view of the above-stated drawbacks, it is a purpose of the present invention to provide an improved seat back structure of an upside-recessed-and-headrest-storage type of seat which not only avoids creation of the foregoing objectionable connection line a headrest storage recession of seat back to improve an outer aesthetic appearance of seat back, but also permits for easy assembly of the seat back with small number of component parts.

In order to achieve such purpose, in accordance with the present invention, there is basically provided a seat of this kind, which includes: a seat back; a headrest storage recession defined in a top portion of the seat back; and a back board of a rigid property which is provided to a backward side of the seat back, the back board including an extension which extends upwardly to occupy a backward side of said headrest storage recession, so that the headrest storage recession defines a three-dimensional space that opens forwardly and upwardly of said top portion of the seat back and is closed by the extension at a backward side thereof, the seat back structure comprising:
- a covering material which basically covers a whole of the seat back;
- a cover element; and
- a hinge portion defined between the cover element and the top end of the extension in such a manner as to be continuous with both of the cover element and the top end of the extension associated with the back board,
- wherein the cover element is integrally and continuously connected, via the hinge portion, with a top end of the extension, and
- wherein the cover element is folded relative to the hinge portion and attached to a forward side of the extension of the back board, whereupon both of the cover element and extension cooperate with each other to constitute a rigid backward wall at the backward side of the headrest storage recession.

As one aspect of the present invention, the hinge portion and the extension of back board may all be covered with one unitary covering material.

As another aspect of the invention, the cover element folded and attached to the extension of the back board has: an inward surface facing that particular extension; and a free end portion, whereas the extension of back board has an inward surface opposingly facing the inward surface of the thus-folded cover element, and one engagement element may be provided to said the inward surface of the cover element at a point corresponding to the free end portion, whereas another engagement element is provided to the inward surface of the extension. The cover element may be securely attached to the extension by securely engaging the afore-said one engagement element with the afore-said another engagement element.

Other features and advantages of the present invention will become apparent from reading of the description, hereinafter with reference to the annexed drawings.

DETAILED DESCRIPTION OF PREFERRED EMBODIMENT OF THE INVENTION

Figure 1:
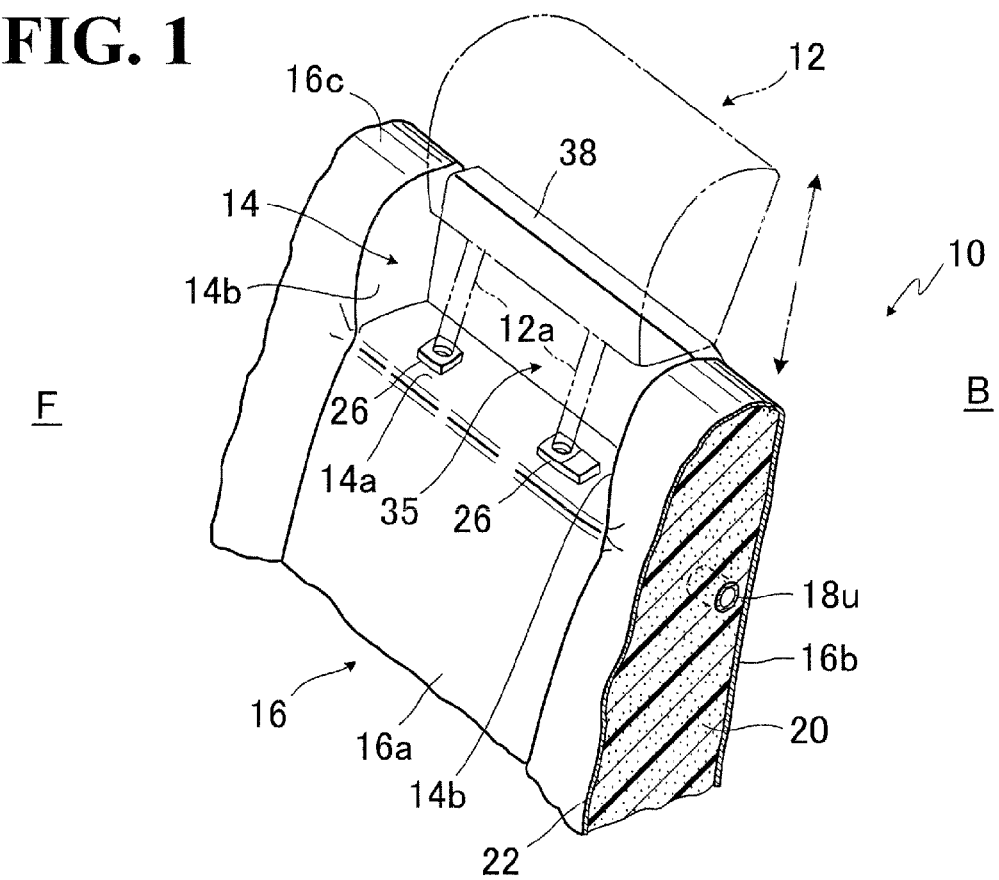
FIG. 1 is a partly broken schematic perspective view showing a principal part of seat back structure in accordance with the present invention.

Referring to FIGS. 1 to 5, there is illustrated a preferred exemplary mode of seat back structure in accordance with the present invention, as generally designated by (10), which is associated with a upside-recessed-and-headrest-storage type of seat (1) having a headrest storage recession (14) defined in a top region (16c) of the seat back (16) thereof. It is noted that a seat cushion for forming the seat (1) is not shown, and that the top region (16c) shall also be referred to as "seat back top" or "seat back top portion" for simplicity.

In this context, it is to be understood that the seat back (16) per se is actually of an upside-recessed-and-headrest-storage type and indeed has the headrest storage recession (14) defined in the seat back top portion (16c) thereof.

As indicated by two-dot chain lines and arrows in FIG. 1, a headrest (12) may be either lowered to and stored in the headrest storage recession (14) or raised therefrom up to a desired use position above the seat back top (16c) (see FIG. 1).

Note that the seat (S) of this kind is known in the art, excepting an improved structure of the seat back (16) thereof which is to be described hereinafter.

Also note that the term, "forward" or "forwardly", refers to a forward side (F) of the seat (1) or seat back (16), and the term, "backward" or "backwardly", refers to a backward side (B) of the seat (1) or seat back (16).

As shown, according to the seat (1), the seat back (16) is basically formed by; a seat back frame (18); a foam padding (20) disposed on a forward side of the seat back frame (18); a covering member (22) that covers an entire outer surface region of the foam padding (20), excepting the backward surface thereof at which the seat back frame (18) lies on a side (at B) backwardly of the seat back (16); a headrest storage recession (14) adapted for receiving and accommodating the headrest (12) therein, the headrest storage recession (14) being defined in the seat back top portion (16c); and a back board (32) including an upward extension (32a).

The seat back frame (18) includes an upper frame member (18u) and a lower frame member (18b), both of which are shown to be disposed on the backward wall of foam padding (20).

Figure 2:
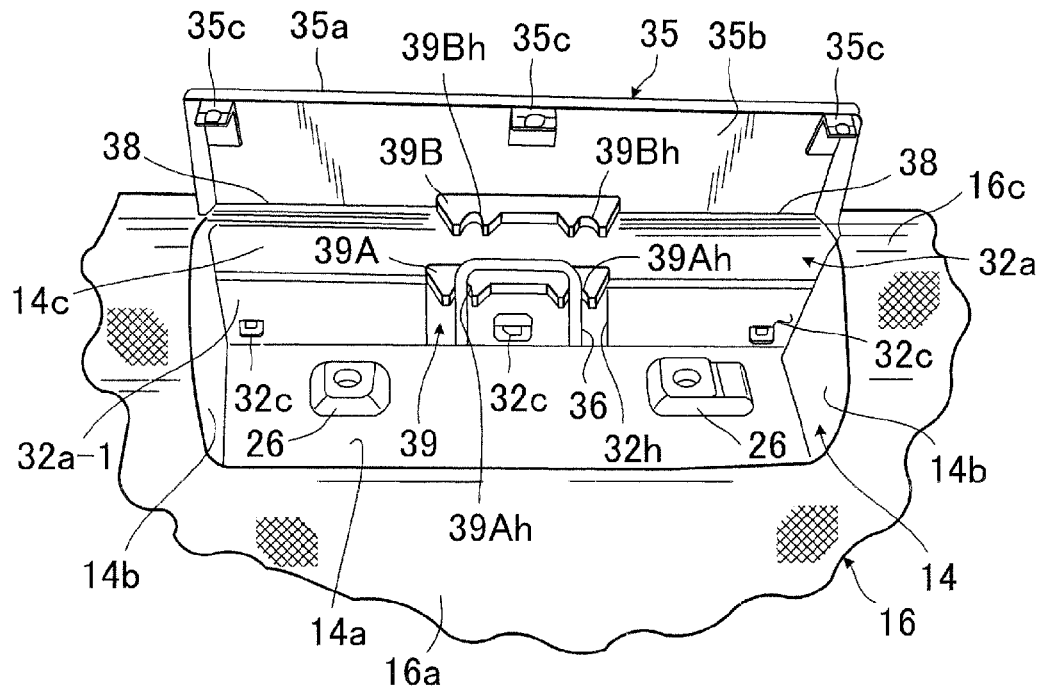
FIG. 2 is a partly broken plan view showing the principal part of seat back structure.

As best seen from FIGS. 1 and 2, the headrest storage recession (14) is provided in the seat back top portion (16c) so as to have a base wall (14a), a pair of side walls (14b) (14b) and a backward wall (14c). The base wall (14a) and two side walls (14b) are defined directly in the seat back top portion (16c), whereas the backward wall (14a) is defined by both of the back board upward extension (32a) and a cover element (35) to be set forth later. Thus, it is observed that a whole of the headrest storage recession (14) assumes such a three-dimensional configuration that opens forwardly and upwardly of the seat back top portion (16c) and closes a backward side of that seat back top portion (16c) as well. Hence, such headrest storage recession (14) is so dimensioned as to receive an entirety of the headrest (12), with only a forward surface of that headrest (12) being exposed therefrom.

Of course, the aforementioned base wall (14a) and two side walls (14b) are covered with the corresponding local cover regions of the afore-said covering member (22).

Figure 3:
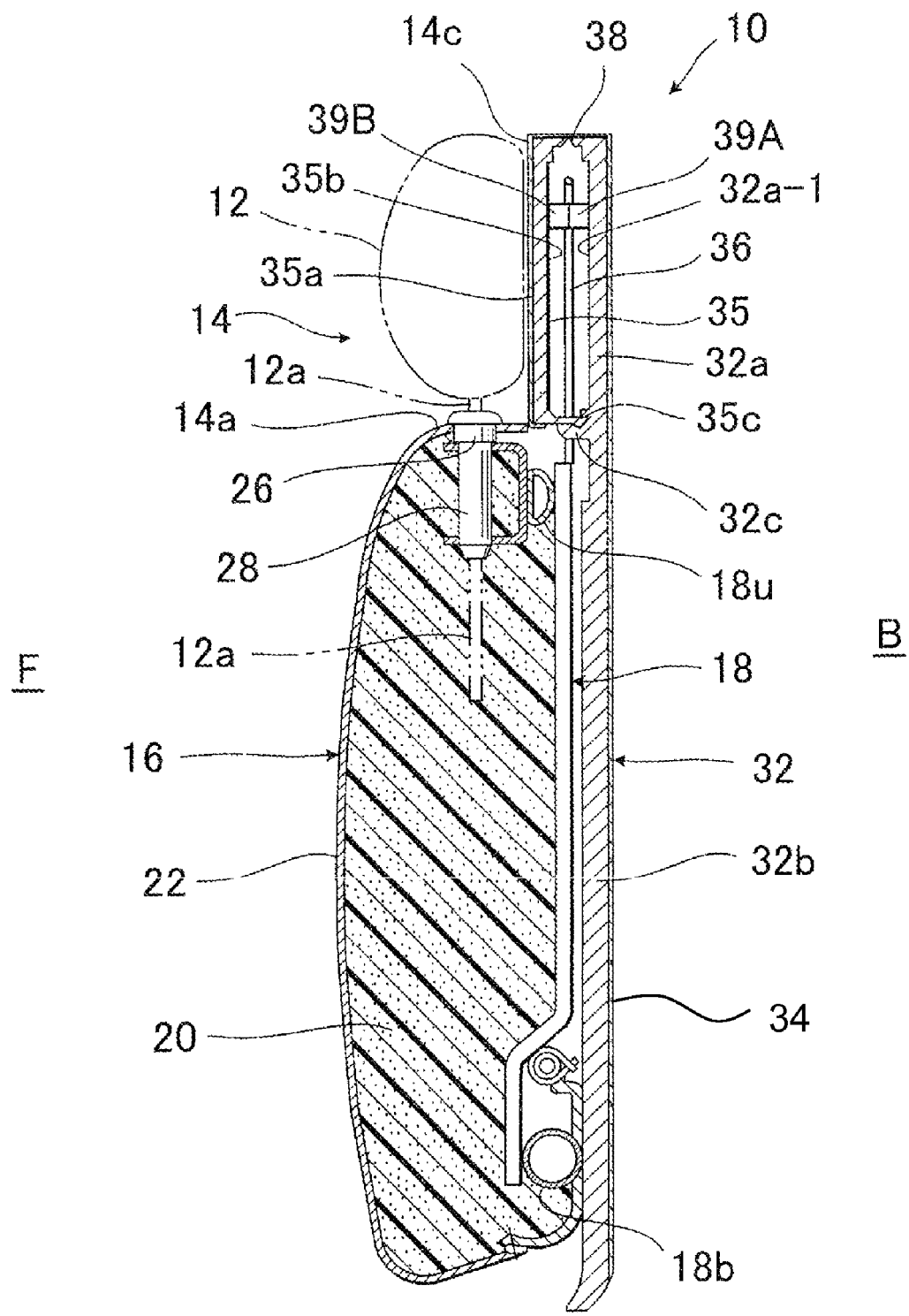
FIG. 3 is a schematic sectional view showing a whole of the seat back structure.

As is known, provided in the base wall (14a) of the headrest storage recession (14) are a pair of headrest stay holders (26) (26) adapted for supportively receiving the respective two headrest stays (12a)) (12a) of the headrest (12) therein. As can be seen in FIG. 3, each of the two headrest stay holders (26) is supported by a tubular support member (28) embedded in the foam padding (20), the tubular support member (28) being fixedly attached via bracket to the upper frame member (18u) of the seat back frame (18), as shown. Since the two headrest stays (12a) are slidably inserted in the respective two holders (26) via a known lock mechanism (not shown), the headrest (12) is adjustably displaceable in a vertical direction towards and away from the headrest storage recession (14).

The back board (32) is formed from a rigid material, such as a rigid synthetic resin material including polypropylene for example, into a fat plate configuration. The back board (32) is securely attached to the seat back frame (18) so as to substantially overlie the entire backward area of the seat back (16), such that the upward extension (32a) thereof occupies a backwardly open side of the headrest storage recession (14) to thereby constitute the backward wall (14c) in that particular headrest storage recession (14).

In accordance with the present invention, a cover element (35) is provided integral with the upward extension (32a) of back board (32) in a foldable manner. A specific description will now be made of arrangement of the cover element (35) in the headrest storage recession (14).

The cover element (35) is formed in such a manner as to be integral and continuous with the afore-said upward extension (32a) of back board (32) and therefore formed from the same resin material as that of the back board (32) (e.g. a rigid synthetic resin material). The size and area of that cover element (35) are substantially equal to those of the back wall (14c) associated with the headrest storage recession (14).

Figure 5:
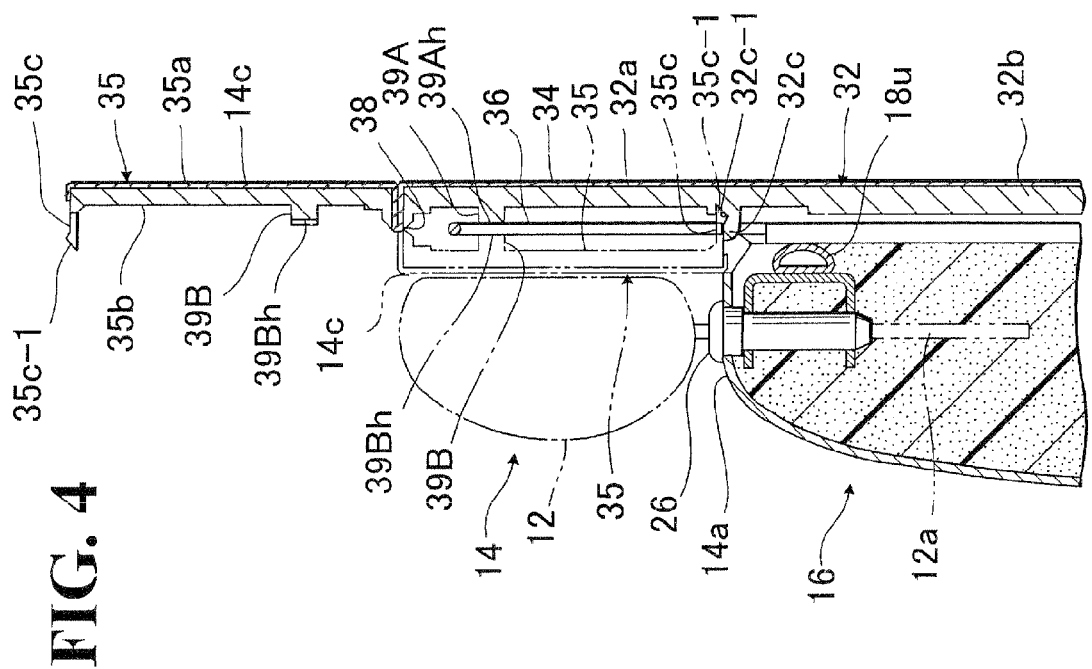
FIG. 5 is a fragmentary sectional view showing a detail of the principal part of seat back structure.

With particular reference to FIGS. 2 and 5, it is seen that, formed along a boundary between the cover element (35) and the back board upward extension (32a) is a hinge portion (38) which is thin or small in thickness relative to the main bodies of those particular cover element (35) and upward extension (32a). More specifically, such hinge portion (39) is formed by recessing both two inward walls (at 32a-1) and (at 35b) respectively of the upward extension (32a) and cover element (35) along the boundary therebetween, so that the cover element (35) is at the base end thereof integrally connected, via the thin hinge portion (38), with the upper end of the back board upward extension (32a) in a continuous manner. Hence, the cover element (35) per se is easily movable upwards and downwards relative to the thin hinge portion (38), thereby being foldable downwardly about the hinge portion (38) and juxtaposed on the forward side (at 32a-1) of the back board upward extension (32a) to constitute the backward wall (14c) of the headrest storage recession (14).

Accordingly, as seen in FIG. 5, due to the above-described arrangement of thin hinge portion (38), both cover element (35) and back board upward extension (32a) provide a unitary and flat surface at the respective top surface portions thereof, which is substantially in registry with the top of headrest storage recession (14). Thus, there is no objectionable connection line between the cover element (35) and back board extension (32a), and an aesthetic outer appearance of the seat back (16) is highly improved.

In addition, it is to be appreciated that the above-described folded and integral connection of the cover element (35) with the back board upward extension (32a) indeed establishes an independent robust construction of the back wall (14c) in the headrest storage recession (14), thereby attaining a required strength of the back wall (14c) to withstand a backward load that may be applied thereto via the headrest (12). This integral and reinforced structure in turns allows for reducing the thickness of each of the cover element (35) and upward extension (32a), while maintaining a required strength thereof, which effectively realizes a substantive reduction in thickness of the back wall portion (14c) of headrest storage recession (14) in order to meet demand for thin thickness of seat back. Further, the integral continuous connection of the cover element (35) with the back board upward extension (32a) permits a worker to easily handle both back board (32) and cover element (35) as one single component part in the process for assembling the seat back (16). Thus, it is possible to decrease the numbers of component parts to a minimum degree and therefore easily maintain and control the required component parts.

As best shown in FIG. 2, in accordance with the present invention, three male engagement pieces (35c), (35c) and (35c) are provided to the free end of the cover element (35), whereas on the other hand, three female engagement pieces (32c), (32c) and (32c), adapted for latch engagement with the respective three male engagement pieces (35c), are provided to a lowermost point of the back board upward extension (32a), wherein such lowermost point is located on substantially the same level with the base wall (14a) of headrest storage recession (14) as best seen from FIG. 3. Due to such engagement arrangement, as understandable in FIGS. 4 and 5, upon the cover element (35) being folded downwardly relative to the hinge portion (38) towards the upward extension (32a), all the three male engagement pieces (35c) are latchingly engaged with the respective three female engagement pieces (32c), so that the cover element (35) is securely attached to and juxtaposed upon the forward side of the back board upward extension (32a), thereby constituting the back wall (14c) of headrest storage recession (14).

Moreover, in accordance with the present invention, an inverted-U-shaped support bar element (36) of a circular cross-section is provided in the headrest storage recession (14) with a view to supporting both cover element (35) and back board upward extension (32a). In this respect, apparently, review of FIGS. 2 and 3 leads anyone skilled in the art to understand that the in inverted-U-shaped configuration of support bar element (36) has a pair of vertical bar sections (not designated) extending downwardly in a direction to the seat back frame (18). While not clearly shown, such two vertical bar sections of the support bar element (36) are actually fixed upon the seat back frame (18), as readily understandable from FIGS. 2 and 3. The support bar element (36) is formed from a rigid bar material, such as a steel bar material.

Figure 4:
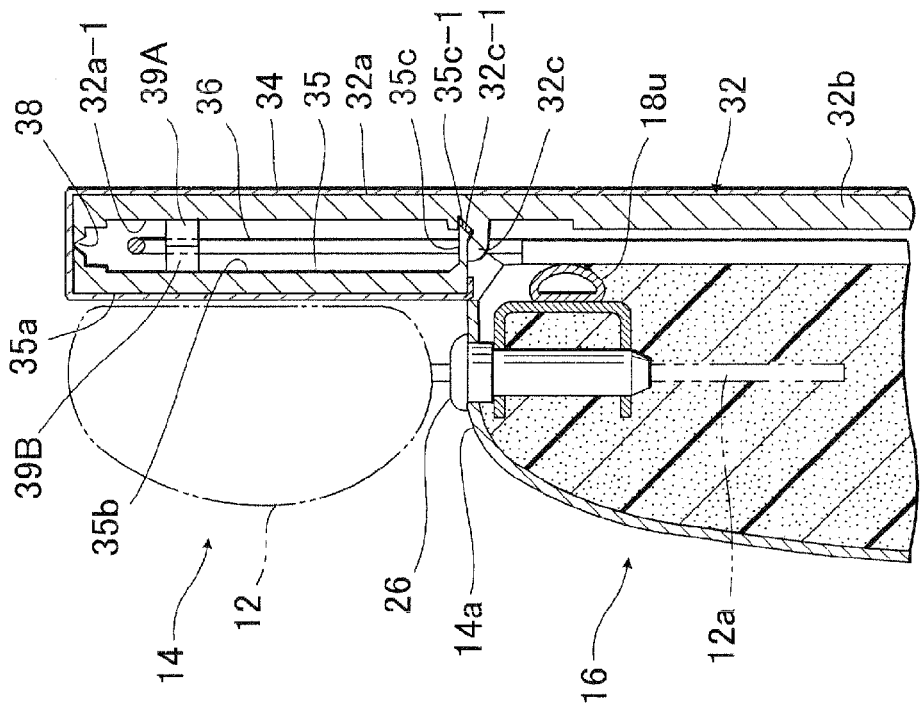
FIG. 4 is a fragmentary sectional view of the principal part of seat back structure, which shows arrangement of a cover element and a back board upward extension and in particular explanatorily shows how the cover element is attached to the back board upward extension.

As seen in FIG. 4, a whole of the support bar element (36) extends vertically from the seat back frame (18) alongside of and in parallel with the inward surface (32a-1) of the back board upward extension (32a) and terminates in the proximity of the hinge portion (38) that connects together the two upper regions respectively of the cover element (35) and back board upward extension (32a).

Designation (39) in FIG. 2 represents a connecting means adapted for connecting both cover element (35) and back board upward extension (32a) with the aforementioned support bar element (36). As far as the illustrated embodiment is concerned, such connecting means (39) comprises: a first connecting member (39A) provided to the back board upward extension (32a); and a second connecting member (39B) provided to the cover element (35).

More specifically, the first connecting member (39A) is fixed on the inward surface (32a-1) of the upward extension (32a) so as to be disposed at the upper end region of that particular upward extension (32a) near to the hinge portion (38), whereas likewise the second connecting member (39B) is fixed on the inward surface (35b) of the cover element (35) so as to be disposed at the upper end region of that particular cover element (35). In this regard, it is essential that the second connecting member (39B) is arranged on that cover element inward surface (35b) such that, upon the cover element (35) folded and attached to the upward extension (32a), the second connecting member (39B) itself is to be brought in alignment with and to contact with the first connecting member (39A) for a purpose to be set forth below.

Referring again to FIG. 2, the first connecting member (39A) has, formed therein, a pair of first spaced-apart semi-circular recessed portions (39Ah) (39Ah), whereas likewise, the second connecting member (39B) has, formed therein, a pair of second spaced-apart semi-circular recessed portions (39Bh) (39Bh) in correspondence with the respective foregoing two semi-circular recessed portions (39Ah) (39Ah). It is noted here that the two first semi-circular recessed portions (39Ah) are respectively equal in radius to the two second semi-circular recessed portions (39Bh). Also, note that a diameter of a circular hole formed between each first semi-circular recessed portion (39Ah) and each second semi-circular recessed portions (39Bh) is substantially equal to an outer diameter of each of the previously described two vertical bar sections of the support bar element (36).

Hence, a comparative review of FIGS. 4 and 5 in conjunction with FIG. 2 clearly indicates that, when the cover element (35) is folded down relative to the hinge portion (38) and attached to the back board upward extension (32a), the second connecting member (39B) of the cover element (35) is brought to a close contact with the first connecting member (39A), whereupon the pair of second semi-circular recessed portions (39Bh) (39Bh) are respectively in alignment with the pair of first semi-circular recessed portions (39Ah) (39Ah), thus forming a pair of circular engagement holes which closely encircles the afore-said two vertical bar sections of the support bar element (36), respectively. Accordingly, as best shown in FIG. 5, the support bar element (36) stands vertically between the cover element (35) and back board upward extension (32a) and is connected with the upper end regions respective of those two particular elements (35 and 32a) via the thus-mated first and second connecting members (39A) (39B).

It is therefore appreciated that the corresponding backward wall (14c) of headrest storage recession (14) is supported by the support bar element (36) in a far increasingly reinforced manner, sufficient to withstand a great or excessive backward load applied thereto via the headrest (12) in the case of collision or the like. Additionally, the provision of the two connecting members (39A) (39B) to the respective cover element (35) and back board upward extension (32a) as well as the fixation of the support bar element (36) to the seat back frame (18) in upwardly projected manner are very significant in terms of allowing for easy and secure attachment of the back board (32) to the seat back frame (18), because it requires the very simple steps of: attaching the back board upward extension (32a) to the support bar element (36) via the first connecting member (39A); and then merely folding and attaching the cover element (35) to that back board extension (32a) until the second connecting member (39B) contacts the first connecting member (39A) so that the two vertical bar sections of the support bar element (36) are automatically encircled by one set of two mated semi-circular recessed portions (39Ah) (39Bh) and another set of two mated semi-circular recessed portions (39Ah) (39Bh).

Still further, in accordance with the present invention, a covering member (34) continuously extends to both of the back board upward extension (32a), and cover element (35) and covers the entire outer surface of that back board extension (32a) as well as the entire outer surface (35a) of the cover element (35) in an integral fashion. Thus, in addition to the previously described unitary flat surface of the top surfaces of or boundary area between those two elements (32a) and (35), such extended and continuous coverage of the covering member (34) at the headrest storage recession backward wall (14c) indeed adds to improvement of aesthetic appearance of the seat back (16) as well as of the headrest storage recession (14) per se.

While having described the present invention, it should be understood that the invention is not limited to the illustrated embodiment, but any modification, replacement and addition may be applied thereto without departing from the scopes of the appended claims.

What is claimed is:

1. A seat back structure of an upside-recessed-and-headrest-storage type of seat which includes: a seat back having a backward side facing backwardly of the seat; a headrest storage recession defined in a top portion of said seat back, said headrest storage recession being adapted for receiving and accommodating a headrest therein; and a back board formed from a rigid material which is provided on a backward side of said seat back, said back board including an extension which is adapted to extend upwardly from a lower wall of the back board to occupy a backward side of said headrest storage recession, so that said headrest storage recession defines a three-dimensional space that opens forwardly and upwardly of said top portion of said seat back and is closed by said extension at a backward side thereof which faces backwardly of said top portion of said seat back, wherein said extension has: a forward side facing forwardly of said seat back; and a top end, said seat back structure comprising:
a first sheet of covering material which basically covers a whole of said seat back, excepting a portion of said backward side of said seat back;
a cover element; and
a hinge portion defined between said cover element and said top end of said extension;

wherein said cover element is integrally and continuously connected, via said hinge portion, with said top end of said extension, and wherein said cover element is folded relative to said hinge portion and attached to said forward side of said extension of said back board, whereupon both said cover element and said extension cooperate with each other to constitute a rigid backward wall at said backward side of said headrest storage recession.

2. The seat back structure as claimed in claim 1, wherein said hinge portion is formed by making thin a corresponding region between said cover element and said extension.

3. The seat back structure as claimed in claim 1, wherein said cover element, said hinge portion and said extension of said back board are all covered with a second unitary sheet of covering material.

4. The seat back structure as claimed in claim 1, wherein said cover element, folded and attached to said extension of said back board, has: an inward surface facing said extension; and a free end portion, wherein said extension of said back board has an inward surface opposingly facing said inward surface of the thus-folded cover element, wherein one engagement element is provided on said inward surface of said cover element at a point corresponding to said free end portion of the cover element, whereas another engagement element is provided on said inward surface of said extension, and wherein said cover element is securely attached to said extension by securely engaging said one engagement element with said another engagement element.

5. The seat back structure as claimed in claim 1, wherein a seat back frame is provided in said seat back, wherein a space is defined between said back board and said cover element folded and attached to said extension, wherein the thus-folded cover element has an inward surface facing said extension, wherein said extension has an inward surface opposingly facing said inward surface of the thus-folded cover element, wherein one connecting element is provided on said inward surface of said cover element, whereas another connecting element is provided on said inward surface of said extension, wherein a support element is fixedly provided to said seat back frame and extends therefrom into said space between said extension and said cover element, wherein said one and another connecting elements are engaged with said support element, so that said back board is securely coupled with and retained to said seat back frame via said support element.

* * * * *